(12) United States Patent
Paulsen et al.

(10) Patent No.: US 10,408,964 B2
(45) Date of Patent: Sep. 10, 2019

(54) MULTIPLE DETECTOR NMR TOOL SYSTEM AND INVERSION METHODS FOR NMR LOGGING

(71) Applicant: SCHLUMBERGER TECHNOLOGY CORPORATION, Sugar Land, TX (US)

(72) Inventors: Jeffrey L. Paulsen, Boston, MA (US); Gal Shulkind, Somerville, MA (US); Yi-Qiao Song, Newton Center, MA (US); Lalitha Venkataramanan, Lexington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 552 days.

(21) Appl. No.: 14/974,252

(22) Filed: Dec. 18, 2015

(65) Prior Publication Data

US 2017/0176626 A1   Jun. 22, 2017

(51) Int. Cl.
*G01V 3/00* (2006.01)
*G01V 3/32* (2006.01)
*G01V 3/14* (2006.01)
*G01V 3/38* (2006.01)

(52) U.S. Cl.
CPC .............. *G01V 3/32* (2013.01); *G01V 3/14* (2013.01); *G01V 3/38* (2013.01)

(58) Field of Classification Search
USPC ........................................................ 324/303
See application file for complete search history.

(56) References Cited

U.S. PATENT DOCUMENTS

| | | | |
|---|---|---|---|
| 5,153,514 A | 10/1992 | Griffin et al. | |
| 5,486,762 A * | 1/1996 | Freedman | G01N 24/081 324/303 |
| 6,140,818 A | 10/2000 | Hurlimann et al. | |
| 6,255,818 B1 | 7/2001 | Heaton et al. | |
| 6,268,726 B1 * | 7/2001 | Prammer | G01N 24/081 324/300 |
| 6,597,171 B2 | 7/2003 | Hurlimann et al. | |

(Continued)

FOREIGN PATENT DOCUMENTS

| EP | 1256020 B1 | 6/2005 |
|---|---|---|
| WO | WO2015031149 A1 | 3/2015 |

OTHER PUBLICATIONS

Butler, J. P. et al., "Estimating Solutions of the First Kind Integral Equations with Nonnegative Constraints and Optimal Smoothing", 1981, SIAM Journal of Numerical Analysis, 18(3), pp. 381-397.

(Continued)

*Primary Examiner* — Rodney E Fuller

(57) ABSTRACT

Systems and methods are described herein for investigating a downhole formation using a nuclear magnetic resonance (NMR) tool. The tool includes multiple detectors spaced along an axis parallel to a length of the wellbore. While the tool is moving through the wellbore, NMR pulse sequences are applied to the formation and resulting NMR signals are detected by the detectors. The data obtained over a period of time by the multiple detectors are inverted together to obtain an indication of a parameter of the formation at multiple locations along the length of the wellbore.

20 Claims, 9 Drawing Sheets

(56) References Cited

U.S. PATENT DOCUMENTS

| | | |
|---|---|---|
| 9,069,098 B2 | 6/2015 | Hopper et al. |
| 2005/0088176 A1 | 4/2005 | Kruspe et al. |
| 2010/0286967 A1* | 11/2010 | Vasilevskiy .............. G01V 7/00 |
| | | 703/2 |
| 2012/0001629 A1 | 1/2012 | Hopper et al. |
| 2012/0049844 A1* | 3/2012 | Leveridge ................ G01V 3/32 |
| | | 324/303 |
| 2013/0093422 A1* | 4/2013 | Morys ...................... G01V 3/32 |
| | | 324/303 |
| 2013/0234706 A1 | 9/2013 | Mandal et al. |
| 2018/0149765 A1* | 5/2018 | Hurlimann ............. G01R 33/50 |

OTHER PUBLICATIONS

Hurlimann, M. D. et al., "Spin Dynamics of Carr-Purcell-Meiboom-Gill-like Sequences in Grossly Inhomogeneous B0 and B1 Fields and Application to NMR Well Logging", 2000, Journal of Magnetic Resonance, 143(1), pp. 120-135.

Akkurt, R. et al., "Challenges for Everyday NMR: an Operator's Perspective", 2006, Society of Petroleum Engineers, SPE 102247, 12 pages.

Edwards, Carl M., "Effects of Tool Design and Logging Speed on T2 NMR Log Data", SPWLA 38th Annual Logging Symposium, (1997) 13 pages.

International Search Report and Written Opinion for corresponding PCT Application Serial No. PCT/US2016/065036, dated Mar. 24, 2017, 18 pages.

\* cited by examiner

MULTIPLE DETECTOR NMR TOOL SYSTEM AND INVERSION METHODS FOR NMR LOGGING

TECHNICAL FIELD

The subject disclosure relates to the use of nuclear magnetic resonance (NMR) in investigating earth formations. More particularly, the subject disclosure relates to methods for the investigation of earth formation traversed by a wellbore using an NMR wellbore logging tool that is moving through the wellbore.

BACKGROUND

Wireline logging measurements made in a wellbore are used to characterize rock formations. A typical run combines multiple tools connected together in series. The multiple tools often include one or more tools such as nuclear, acoustic, resistivity, and NMR tools. Typically, the measurement tools are reeled up the oil well at a constant speed with all of the tools continuously measuring the formation. The results of the multiple physical measurements made by the tools are often combined for interpretation.

In running multiple tools, the "slowest" tool determines measurement time. As the cost of rig time during logging is significant, logging time is an important factor when considering which measurements to collect. Thus, NMR as a "slow" measurement is generally limited from broader routine application in large part due to its slow logging speed.

In particular, NMR measurements typically characterize both the signal intensity (porosity) and $T_2$ decay time (pore size and fluid types). Tool motion affects both of these quantities. The effect of tool motion on the signal intensity is due to long $T_1$ recovery times. The $T_2$ decay is also affected by motion because the detection region is of limited extent and typical tool motion over the longer relaxation times (~1 s) can be comparable to detector size. Furthermore, there is significant additional signal decay due to the detector leaving the region from where the NMR signal originates. While some compensation is possible for this additional decay, existing NMR tools cannot achieve the desirable logging speeds of other tools (e.g., 1800 ft/hr) and still yield high quality NMR data.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a system for logging a wellbore traversing a formation. The system includes a nuclear magnetic resonance (NMR) tool. The tool includes a magnet that applies a static magnetic field to the formation and a transmission-detection module that applies an oscillating magnetic field to the formation and that includes multiple detectors that detect NMR signals generated within the formation. The multiple detectors are spaced along an axis parallel to the longitudinal axis of the tool. The system for logging further includes a processor that receives detector data that corresponds to the NMR signals detected by the multiple detectors over time and as the NMR tool moves along a length of the wellbore. The processor determines a parameter of the formation at multiple locations along the length of the wellbore (a) by using the detector data obtained from at least two of the detectors together and (b) by accounting for tool motion along the length of the wellbore. In one embodiment, the detector data is analyzed in order to obtain the $T_2$ distribution profile as a function of location along the wellbore.

By using multiple detectors and methods for interpreting and analyzing resulting data, according to some embodiments, the logging speed of the NMR tool may be increased relative to prior art single detector NMR tools while providing good spatial resolution. In one aspect, the total length of the multiple detectors (and source) determines feasible logging speed, while individual detector size determines resolution.

In various embodiments, the detectors of the NMR tool make measurements which are related to the $T_2$ distribution profile along the wellbore by a relationship that is a function of the sensitivity function of the detectors, the location of the tool, the velocity of the tool, and noise. In one embodiment, the $T_2$ distribution profile may be obtained by solving an equation describing the relationship. In one embodiment, the equation is solved by stacking detector data into a vector, by stacking a four-dimensional tensor represented by a Kernel $K(n, t, r, T_2)$ where n is the detector index, t is a time index, r is a location index, and $T_2$ is the decay time, into a two-dimensional matrix and then compressing the detector data to a reduced-order space and solving a non-linear optimization problem in order to estimate the $T_2$ distribution profile.

In one embodiment, the detector data from the NMR tool are represented by $$\{V_{xy,n}(t)\} \begin{cases} n = 1, 2, \ldots, N \\ t = t_1, t_2, \ldots, t_T \end{cases},$$

where N is the number of detectors (coils) of the tool, and T is the number of time samples over which detection is made (e.g., the number of echoes of a CPMG sequence). The detector data are related to the $T_2$ distribution profile according to:

$$V_{xy,n}(t) = \int\int s_n(r - vt)\exp\left(-\frac{t}{T_2}\right)\phi(r, T_2)drdT_2 + \varepsilon_n(t) =$$

$$\int\int K(n, t, r, T_2)\phi(r, T_2)drdT_2 + \varepsilon_n(t),$$

where $\phi(r, T_2)$ is the $T_2$ distribution profile versus position (r), $s_n(r)$ is the sensitivity function for the $n^{th}$ detector at time t=0, $\varepsilon_n(t)$ is detector noise, v is the velocity of the tool, and K is a Kernel constructed to match the signal equation.

As rewritten, the term having the Kernel K may be identified as a two-dimensional Fredholm integral equation of the first kind. As previously suggested, the relationship between the measurement data (D) and the $T_2$ distribution profile may be solved by collecting the measurements into an equivalent vector (e.g., by column-wise stacking), and similarly stacking the four-dimensional tensor represented in the kernel $K(n, t, r, T_2)$ into a two-dimensional matrix in order to obtain $D=KA+\varepsilon$, where the length of D is $|D|=TN\times 1$, the length and the width of K are TN, $|r||T_2|$, respectively, the length of A is $|A|=|r||T_2|\times 1$, and the length of $\varepsilon$ is $|\varepsilon|=TN\times 1$. In this specific embodiment, D corresponds to a stack of measurements (e.g. echoes) from all the detectors and A corresponds to a stack of $T_2$ distributions at all spatial coordinates.

In one embodiment, an approximate linear model is used so that detector signals are converted into signals as a function of position coordinates.

In various embodiments, the transmission-detection module of the NMR tool includes a source for applying the oscillating magnetic field to the formation. In some embodiments, the multiple detectors function as both the source and detectors (e.g., the source and the detectors are the same coils). In another embodiment, the source and the multiple detectors function separately (e.g., the source coil is different and separate from the detector coils.

Further embodiments of the present disclosure are directed to a method of investigating an earth formation surrounding a wellbore. The method includes moving a NMR tool with multiple detectors along a length of the wellbore and applying an oscillating magnetic field to the earth formation surrounding the wellbore while the tool is moving. The method further includes detecting NMR signals with the detectors to obtain detector data and processing the detector data to obtain a parameter of the formation at multiple locations along the length of the wellbore by accounting for tool motion along the length of the wellbore.

Additional aspects, embodiments, objects and advantages of the disclosed methods may be understood with reference to the following detailed description taken in conjunction with the provided drawings.

DETAILED DESCRIPTION

As used herein, the position "r" represents a coordinate of a point in the formation and r may be a vector with three components: X, Y, and Z. In some equations provided herein, r may be written as "r" to indicate that r is a vector.

As used herein, lower-case x, y, and z refer to a coordinate system in the nuclear magnetic resonance (NMR) rotating frame. For example, the lower-case "xy" in the symbol $V_{xy,n}(t)$ refers to the NMR rotating frame.

As used herein, upper-case X, Y, and Z refer to a spatial coordinate system, as shown in FIGS. 3, 11A-C and 12A-C.

Figure 1A:
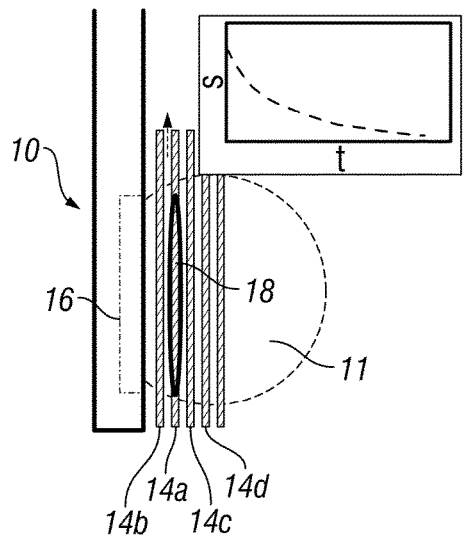
FIG. 1A is a diagram illustrating a single coil NMR tool and its response.

Before describing an NMR tool with multiple detectors that is moved along the length of a wellbore, and the interpretation and analysis of data obtained by such a tool, it is useful to understand some theoretical matters that inform the embodiments. In particular, an NMR logging tool generally includes a permanent magnet that produces a static magnetic field ($B_0$) over the detection region for aligning nuclear magnetization, and a single radio frequency coil ($B_1$) that initially excites this magnetization and observes its oscillations. The strength of the magnetic field $B_0$ sets the NMR observation frequency, and because its strength decays with distance from the tool, this sets a resonant shell within the formation where the signal can be detected at a given frequency. Thus, as seen in FIG. 1A, a tool 10 located in a wellbore is shown with a detection region 11 and a detected volume 14a indicated. By using multiple frequencies, multiple resonant regions (shells) at different depths 14b, 14c, 14d can be detected. The magnetization in this region must further be excited and detected by a radio frequency (RF) coil 16 to collect the NMR signal over the region of the shell it can see 18. A decaying signal over time is shown in the insert of FIG. 1A.

Figure 1B:
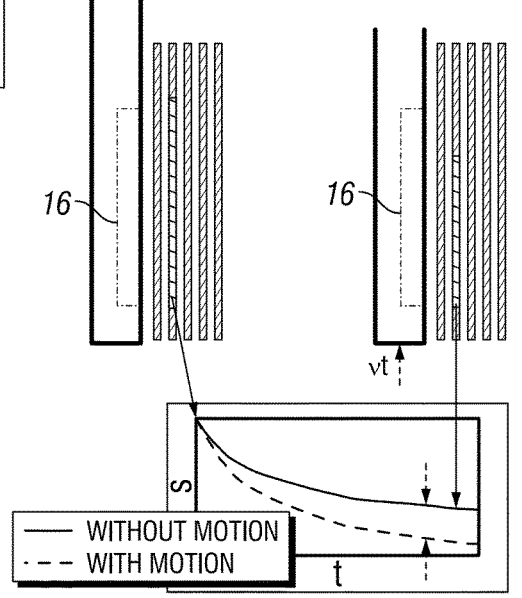
FIG. 1B is a diagram illustrating motion of a single coil NMR tool and its response.

As suggested in FIG. 1B, the initial excitation pulse sets the region of signal that is detected. In the case of a moving tool, during the acquisition of long signal decays, the coil 16 will steadily leave this region due to tool motion (compare the left diagram of FIG. 1B with the right diagram where the tool has moved a distance vt where v is the velocity of the tool and t is time). The tool motion results in an additional source of signal decay interfering with the correct characterization of long decay times as suggested by the corresponding decay curves seen in the insert of FIG. 1B. For a fixed coil size, there is thus a compromise between tool speed and the longest signal decay that can be accurately characterized. Lengthening the detection region can improve this compromise but at the expense of spatial resolution.

The exact NMR signal intensity and decay depends on the details of the applied magnetic field ($B_0$) and RF field produced by the coil ($B_1$). For a single coil tool without motion, this signal model has been previously detailed by Hurlimann, M. D., and Griffin, D. D., "Spin Dynamics of Carr-Purcell-Meiboom-Gill-like Sequences in Grossly Inhomogeneous B0 and B1 Fields and Application to NMR Well Logging," Journal of Magnetic Resonance 143, 12-135 (2000), which is hereby incorporated by reference herein in its entirety. Thus, for the dynamics of the nuclear magnetization detected in NMR (vector m(t)) and the NMR signal, only the component of the RF field that is circularly polarized and orthogonal to the vector $B_0$ needs to be considered $$B_{1c} = \frac{1}{2}\left[B_1(r) - B_0(r)\frac{B_1(r) \cdot B_0(r)}{B_0(r) \cdot B_0(r)}\right]$$

assuming that the RF field is significantly less than the applied magnetic field ($|B_1| \ll |B_0|$). The behavior of m(t) and the NMR signal then depends on vector quantities $B_0$ and $B_{1c}$ through two scalar quantities, the frequency offset $\Delta\omega_0 = (\omega_{RF} - \gamma|B_0|)$, where $\omega_{RF}$ is the angular frequency of the RF pulse, and the RF pulse strength $\omega_1$, where $-\gamma B_{1c}(t) = \omega_1 \cos(\omega_{RF} t + \phi)$ and $\phi$ is the phase of the RF pulse. From these, the dynamics of m(t; r) may be calculated. Finally, given that the NMR tool uses a coil for detection (in the near field of the RF coil), the voltage induced across the coil is:

$$V_{xy}(t) = \frac{2\chi}{\mu_0}\int dr\, \phi(r) B_0^2(r) \frac{\omega_1(r)}{I} F(\Delta\omega_0(r)) m_{xy}(t; r) \tag{1}$$

where $\chi$ is the nuclear susceptibility, $\phi(r)$ is the local spin density, $m_{xy}(t; r)$ is the local transverse magnetization (transverse to the direction of the applied magnetic field $B_0(r)$) normalized to the equilibrium magnetization and $F(\Delta\omega_0)$ is the frequency response of the detection system. Underlying this equation, is the fact that the ratio of the RF field strength produced by a current I in the coil $$\frac{\omega_1(r)}{I},$$

gives the efficiency of the coil to detect magnetization at point r by reciprocity. The value of $m_{xy}(t; r)$ in equation (1) is complex valued so that the value may represent the phase of the magnetization in the xy-plane ($m_{xy} = m \cdot \hat{x} + im \cdot \hat{y}$). Thus, the detected voltage $V_{xy}(t)$ is also complex after demodulation with a quadrature receiver. This is how the measurement is typically stored by the NMR electronics of the tool.

Given $m_{xy}(t; r)$, the computation of the NMR signal is straight forward from the prior equation. The primary complication in determining the NMR signal for a logging tool arises in the determination of $m_{xy}(t; r)$ and depends on the exact pulse sequence which consists of the exact timings and phases of the transmitted RF pulses and signal acquisition. However, in the limit of grossly inhomogeneous fields and the use of the known CPMG (Carr-Purcell-Meiboom-Gill) pulse sequence seen in FIG. 2 (where an initial excitation pulse or 90 degree $\mathfrak{R}_A$ is followed by a large number of refocusing cycles or 180 degree rotations $\mathfrak{R}_B$), this expression will simplify. The following description summarizes the derivation for the computation of $m_{xy}(t; r)$ assuming negligible relaxation, which will later modify the final equation. Furthermore, to simplify the description of the dynamics of m(t; r), a separate rotating frame of reference for each position r is used which rotates at the RF carrier frequency $\omega_{RF}$ around the local direction of $B_0(r)$.

The initial normalized magnetization for the NMR measurement, m(t=0; r) is the unit vector along the direction of the applied magnetic field $B_0(r)$ defined locally to be along the $\hat{z}$ axis. The local directions ($\hat{x}$ and $\hat{y}$) are defined such that $\hat{x}$ points along the local direction of $B_{1c}$ when $\phi=0$. This initial magnetization is static and so will produce no NMR signal. Thus, the NMR pulse sequence will start with an RF excitation pulse (I≠0) to rotate m(t; r) into the transverse plane ($m_{xy} \neq 0$) where it will oscillate at $\omega = \gamma B_0$ and be observable by inductive detection with an RF coil. The corresponding rotation axis $\hat{n}$ and nutation frequency $\Omega$ produced by any RF pulse depends on $\omega_1$ and $\Delta\omega_0$ and in the rotating frame of reference evaluates to:

$$\Omega = \sqrt{\Delta\omega_0^2 + \omega_1^2} \tag{2a}$$

$$\hat{n} = \frac{\omega_1}{\Omega}[\cos(\phi)\hat{x} + \sin(\phi)\hat{y}] + \frac{\Delta\omega_0}{\Omega}\hat{z}. \tag{2b}$$

This pulse is typically done for a nominal $\pi/2$ rotation of the magnetization. In the absence of RF pulses, this transverse magnetization will then rotate about $\hat{z}$ in the rotating frame of reference at the frequency $\Delta\omega$. For a logging tool, this signal will quickly decay due to the broad distribution of $|B_0|$ and hence $\Delta\omega$. The CPMG pulse sequence repeats a series of RF pulses (nominally $\pi$ radians each) and delays, such that the signal is refocused at the end of each repeated unit (delay-pulse-delay).

Figure 2:
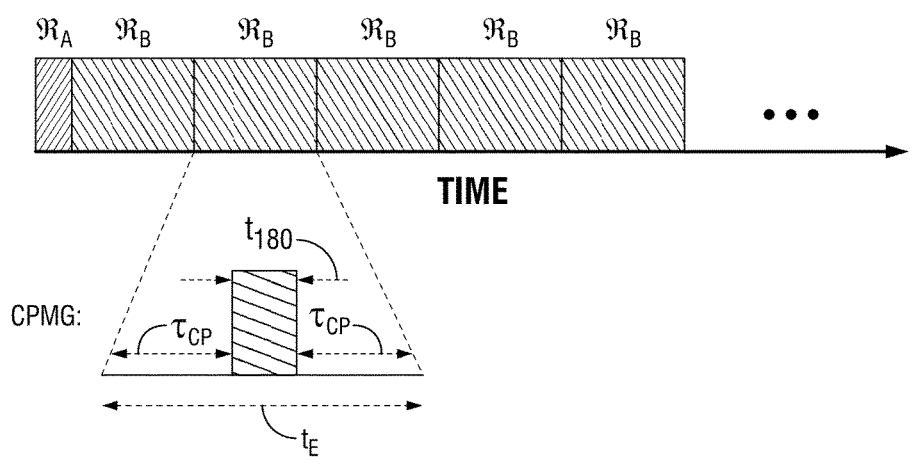
FIG. 2 is a diagram of an NMR pulse sequence.

Since relaxation can be neglected, each of these steps (pulse and delay) can be represented as a rotation as well as their combinations. Thus, the initial pulse and delay for a given value of ($\Delta\omega_0$, $\omega_1$) will correspond to a rotation angle and axis ($\alpha_A$, $\hat{n}_A$) for a rotation matrix $\mathfrak{R}_A(\alpha_A, \hat{n}_A)$, which describes the overall motion of the magnetization during this period. Similarly, the refocusing unit ($\tau_{CP}$-$t_{18\,0}$-$\tau_{CP}$) as shown in FIG. 2 can also be represented as a single rotation matrix $\mathfrak{R}_B(\alpha_B, \hat{n}_B)$. The magnetization at the end of the $N^{th}$ refocusing unit is then:

$$m_N = [\mathfrak{R}_B(\alpha_B,\hat{n}_B)]^n \mathfrak{R}_A(\alpha_A,\hat{n}_A)\{\hat{z}\} = \mathfrak{R}_B(n\alpha_B,\hat{n}_B)$$
$$\mathfrak{R}_A(\alpha_A,\hat{n}_A)\{\hat{z}\} \tag{3}$$

This magnetization equation can then be decomposed into a constant and an oscillating term:

$$m_N = \hat{n}_B(\hat{n}_B \cdot \mathfrak{R}_A\{\hat{z}\}) + [\mathfrak{R}_A\{\hat{z}\} - \hat{n}_B(\hat{n}_B \cdot \mathfrak{R}_A\{\hat{z}\})]\cos(N\alpha_B) + (\hat{n}_B \times \mathfrak{R}_A\{\hat{z}\})\sin(N\alpha_B) \tag{4}$$

Because $\alpha_B$ depends on $\Delta\omega_0$ and $\omega_1$ and these two quantities are grossly inhomogeneous, after the first few echoes (n~3) only the constant term will coherently add and the magnetization can be approximated by:

$$m_N = \hat{n}_B(\hat{n}_B \cdot \mathfrak{R}_A\{\hat{z}\}) e^{-t/T_2} \tag{5}$$

where the $T_2$ relaxation term has been reintroduced which is the decay of signal due to relaxation. Technically, this $T_2$ may not be the 'true' $T_2$ of the sample, and will be slightly perturbed depending on its difference to $T_1$ and the values of $\Delta\omega_0$ and $\omega_1$ as detailed in the previously incorporated Hurlimann et al. reference. Finally, the components for axis of the rotation $\mathfrak{R}_B$, $\hat{n}_B$, as well as the effective rotation angle, for square refocusing pulses with phase $\phi=0$ can be described by a set of analytical closed form expressions:

$$n_x = 0 \tag{6a}$$

$$n_y = \frac{\frac{\omega_1}{\Omega}\sin\beta_2}{\sqrt{\left[\frac{\omega_1}{\Omega}\sin\beta_2\right]^2 + \left[\sin\beta_1\cos\beta_2 + \frac{\Delta\omega_0}{\Omega}\cos\beta_1\sin\beta_2\right]^2}} \tag{6b}$$

$$n_z = \frac{\sin\beta_1\cos\beta_2 + \frac{\Delta\omega_0}{\Omega}\cos\beta_1\sin\beta_2}{\sqrt{\left[\frac{\omega_1}{\Omega}\sin\beta_2\right]^2 + \left[\sin\beta_1\cos\beta_2 + \frac{\Delta\omega_0}{\Omega}\cos\beta_1\sin\beta_2\right]^2}} \tag{6c}$$

where rotation angle $\alpha_B$ satisfies $$\cos\left(\frac{\alpha_B}{2}\right) = \cos\beta_1\cos\beta_2 - \frac{\Delta\omega_0}{\Omega}\sin\beta_1\sin\beta_2 \quad (6d)$$

and $$\beta_1 = \Delta\omega_0\tau_{CP}, \beta_2 = \Omega t_{180}/2 \quad (6e)$$

Figure 3:
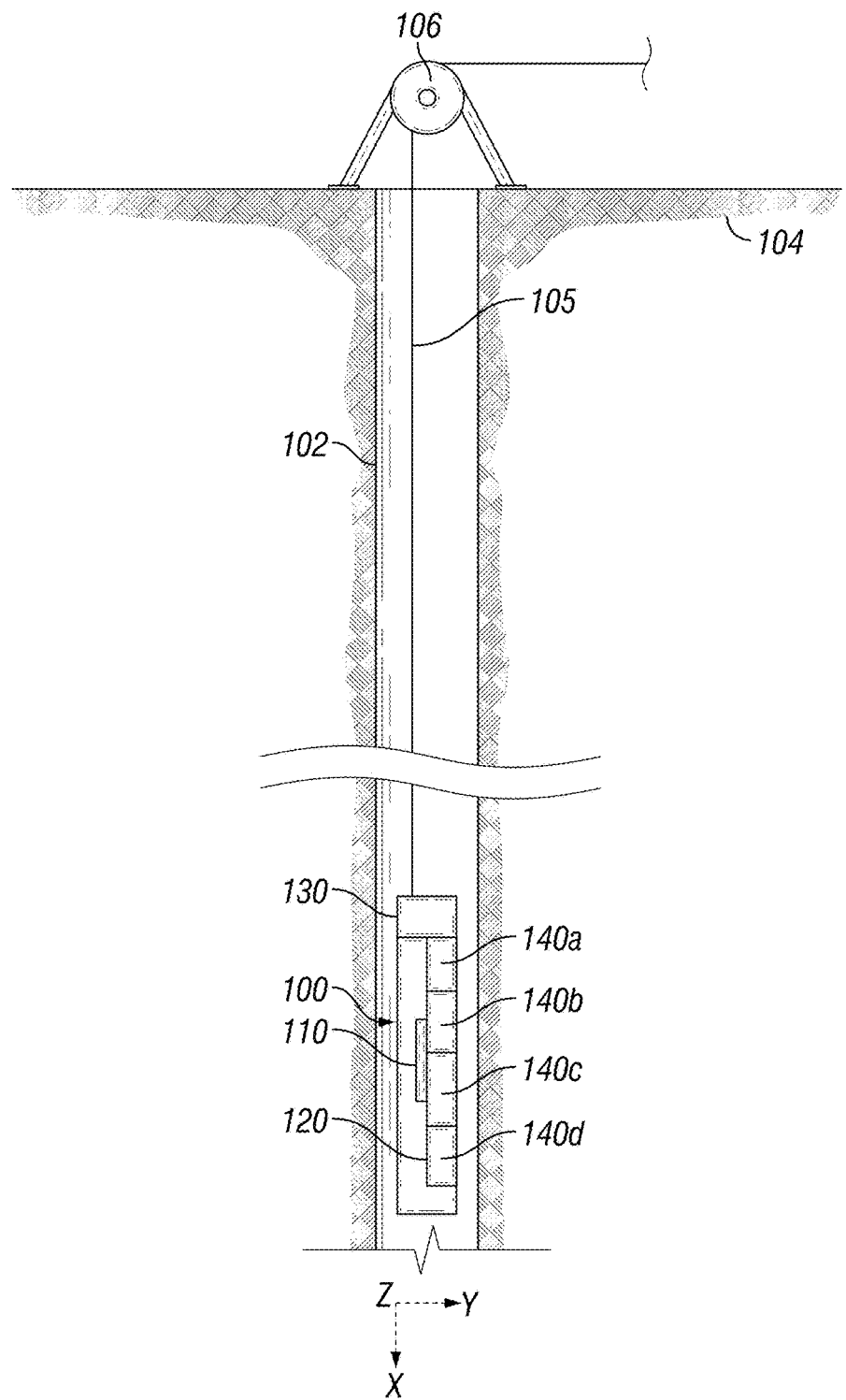
FIG. 3 is a diagram illustrating a multiple coil NMR logging tool.

In one aspect, in order to maintain resolution while retaining the capacity to characterize long relaxation times at fast logging speeds, a multiple detector logging tool and system is provided. As seen in FIG. 3, an NMR logging tool 100 is suspended in a wellbore 102 traversing a formation 104 by a cable 105 that is wound around a winch or hoist 106 or other movement apparatus for causing the tool to move through the wellbore. It will be appreciated that the term "movement apparatus" is to be understood broadly to include winches, hoists, and any other equipment used for moving a tool in wireline, slickline, coiled tubing and other applications. The velocity of the NMR logging tool 100 along the wellbore 102 can be obtained from the velocity of the cable 105 recorded at the winch 106 or the velocity can be obtained from sensors on the tool itself (e.g., accelerometers). The tool 100 includes a permanent magnet 110, a transmission-detection module 120, and one or more processors 130. The one or more processors may be considered a processing module that may be located downhole and/or uphole. The processor module may be coupled to equipment that provides a visible indication of a parameter of the formation.

The transmission-detection module 120 includes one or more excitation coils that apply an oscillating magnetic field to the formation 104 adjacent to the wellbore 102. The oscillating field applied by the excitation coils is composed of a sequence of RF pulses that tip the magnetization of the atomic nuclei within the formation away from an initial magnetization produced by the magnet 110 (also referred to as a "NMR pulse sequence"). The sequence of pulses and the static magnetic field interact with the nuclei in a manner such that a NMR signal composed of "echoes" is generated within at least a portion of the formation.

The transmission-detection module 120 also includes a plurality of detectors for detecting the NMR signals produced by nuclei within the formation 104 excited by the sequence of pulses. A "detector" is a loop that has inductance and will produce a magnetic field when current is supplied therethrough. The detector can be implemented as a looped wire. The looped wire can be serpentine (two-dimensional) or spiraled (three-dimensional). The detectors are also referred to herein as "coils" or "antennas." In one embodiment, the detector is implemented as a half-coax antenna. Half-coax antennas are described in U.S. Pat. No. 5,153,514 to Griffin et al., issued on Oct. 6, 1992 (the '514 patent), which is hereby incorporated by reference in its entirety herein. The '514 patent describes an antenna with a half-cylindrical geometry. The plurality of detectors may be an array of detectors, which includes detectors that have similar geometries and dimensions and that are regularly spaced. Each detector may have its own receiver electronics in order to receive its signal independent from other detectors. Each receiver may contain a low noise preamplifier, a variable gain amplifier, and feedback circuitry to stabilize the receiver. Each detector may be associated with its own processor, or one or more processors may be coupled to all of the detectors. The processors may receive detector data generated by each detector that corresponds to the detected NMR signals at each detector.

As shown in FIG. 3, the transmission-detection module 120 includes an array of coaxial RF coils (four shown) 140a-140d in series. The coils 140a-140d are spaced along an axis that is parallel to the tool 100. The axis of the tool is designated as "X" in FIGS. 3, 11A-11C, and 12A-12C. The coils 140a-140d can be pulsed on simultaneously to transmit NMR pulse sequences (e.g., so that they behave as a single large coil) or can be pulsed on individually to transmit NMR pulse sequences.

The coils 140a-140d also function as detectors. Each of the coils has separate (individual) detection. In this manner, the initially excited region can be made relatively long so as to allow for the characterization of long signal decays at fast logging speeds, while logging resolution is maintained because each individual coil can only detect signals over a smaller region. While four detectors (coils) are shown in FIG. 3, it will be appreciated that other numbers of detectors may be utilized such as two, three, five, six, seven, eight, nine, ten and more. In one embodiment, the number of coils used during logging is dependent on logging speed and/or $T_2$ resolution. In one embodiment, the coils are tuned to a resonance frequency, while in another embodiment, untuned coils are utilized. See, e.g., U.S. Patent Application Publication 2012/0001629 to Hopper et al., published on Jan. 5, 2015 and U.S. Patent Application No. 2013/0234706 to Mandal et al., published on Sep. 12, 2013, which are hereby incorporated by reference herein in their entireties. Additional embodiments and details of NMR logging tools are discussed hereinafter with reference to FIGS. 11A-11C and 12A-12C.

The below description details NMR signal behavior for multiple coils with motion and provides inversion algorithms to recover a $T_2$ distribution profile having good resolution at high logging speeds when using an NMR logging tool having multiple receiver coils, such as NMR tool 100 of FIG. 3.

In various embodiments, the NMR signal equations (1) and (5) are adjusted for multiple RF receive coils. Separate $B_{1c}(r)$ maps (and thus $\omega_1(r)$) can be used for each RF coil. Then, the spin dynamics of $m_N$ (equation (5)) are determined solely by the $B_{1c}(r)$ field of the transmit coil which is labeled as $B_{1c,t}(r)$ and $\omega_{1,t}(r)$. The signal for a given ($n^{th}$) receive coil only modifies the term $$\frac{\omega_1(r)}{I}F(\Delta\omega_0(r))$$

in signal equation (1) so that $$\frac{\omega_{1,n}^*(r)}{I_n}$$

is the efficiency of the $n^{th}$ receive coil and $F_n(\Delta\omega_0(r))$ is the overall frequency response of the coil and associated electronics. Thus, the NMR signal sensitivity for the $n^{th}$ coil becomes:

$$V_{xy,n}(t) = \frac{2\chi}{\mu_0}\int dr\phi(r)B_0^2(r)\frac{\omega_{1,n}^*(r)}{I}F_n(\Delta\omega_0(r))m_{xy}(t;r), \quad (7)$$

where the magnetization dynamics are determined by the transmitter ($\omega_{1,t}$ and $\Delta\omega_0$), thus $m_{xy}(t; r)$ will be replaced by:

$$m_N(t;r) = \hat{n}_B(\omega_{1,t},\Delta\omega_0)[\hat{n}_B(\omega_{1,t},\Delta\omega_0) \cdot \mathfrak{R}_A(\omega_{1,t},\Delta\omega_0)\{\hat{z}\}]e^{-t/T_2}. \quad (8)$$

The change to $\omega_{1,n}(r)$ in equation (7) is more than a simple relabeling of the variable. It may become a complex valued function because the direction of the field produced by the transmit and receive coils ($B_{1c,t}(r)$) and $B_{1c,n}(r)$) are not necessarily aligned. Thus, the x/y axes are defined based on the transmit field ($B_{1c,t}(r)$) when determining the function $\omega_{1,n}(r)$. This selection leads to a simplified expression because the transmit field determines the dynamics of $m_N$.

In one embodiment, the tool motion may be approximated to be a constant linear motion at a velocity "v". This can strongly affect the observed signal in terms of the spin dynamics ($m_n$) and sensitivity to the magnetization ($V_{xy}(t)$) as the magnetic fields ($B_0$ and $B_{1c}$) experienced for a given portion of the sample change as a function of time. For convenience, two relevant sets of coordinates can be introduced: the absolute position of the rock formation, r, and a set of position coordinates relative to the tool, $r_{tool}$, where the relevant magnetic fields ($B_0$ and $B_{1c}$) are then constant as a function of time. $r_{tool}$ has three components, $X_{tool}$, $Y_{tool}$ and $Z_{tool}$. These coordinates are then related as $r = r_{tool} - vt$, where the coordinates are further defined such that they match at the start of the CPMG measurement at $t=0$. Since the tool moves along the X axis: $X = X_{tool} - vt$.

During application of a CPMG sequence, the dynamics of the magnetization necessarily change due to the magnetic fields varying at a given point in the formation over the course of the measurement. Thus, the corresponding rotation matrix to the refocusing section ($\mathfrak{R}_{B,n}(\alpha_B, \hat{n}_B)$) is continuously changing with each echo. In one aspect, the full numerical analysis of these dynamics can be made, but this numerical approach is computationally insensitive and does not lead to a general insight to the effect of motion on CPMG refocusing. Instead, an adiabatic-like approximation can be made to understand these dynamics.

In particular, it is assumed that the refocusing pulses are 'fast' (typically a ~200 μs repetition rate) compared to the tool motion. Then the effective rotation axis $\hat{n}_{B,n}$ will gradually change and the asymptotic magnetization $m_n$ will track this orientation (the adiabatic-like approximation). Thus, the magnitude of the initial magnetization will still depend on the projection of the excited magnetization at $t=0$:

$$\hat{n}_B(\omega_{1,t},\Delta\omega_0) \cdot \mathfrak{R}_A(\omega_{1,t},\Delta\omega_0)\{\hat{z}\} \rightarrow \hat{n}_B[\omega_{1,t}(r),\Delta\omega_0(r)] \cdot \mathfrak{R}_A[\omega_{1,t}(r),\Delta\omega_0(r)]\{\hat{z}\}. \quad (9a)$$

The orientation of this refocused magnetization then follows the orientation of the current CPMG refocusing unit:

$$\hat{n}_B(\omega_{1,t},\Delta\omega_0) \rightarrow \hat{n}_B[\omega_{1,t}(r+vt),\Delta\omega_0(r+vt)] \quad (9b)$$

where the functions of the magnetic fields, $\omega_{1,t}$ and $\Delta\omega_0$, are defined to use the coordinates relative to the tool's position since these functions are then constant in time, but use the formation coordinate "r" as input since this position uniquely identifies the region of magnetization. The magnetization equation (8) with motion therefore becomes:

$$m_N(t;r) = \hat{n}_B(\omega_{1,t}(r+vt),\Delta\omega_0(r+vt))[\hat{n}_B(\omega_{1,t}(r),\Delta\omega_0(r)) \cdot \mathfrak{R}_A(\omega_{1,t}(r),\Delta\omega_0(r))\{\hat{z}\}]e^{-t/T_2(r)} \quad (10)$$

The sensitivity of the tool depends on the position of the receiver coil relative to the detected portion of the formation, and thus, according to one aspect, equation (7) is modified to use the appropriate magnetic fields. Again, defining the functions that reflect the relevant magnetic fields, $B_0$, $\omega^*_{1,n}$, $\Delta\omega_0$, in terms of the tool's coordinates ($r_{tool}$) but using the formation's coordinates (r) for input and to describe the magnetization function's spatial dependence $m_{xy}(t; r)$, the full signal equation becomes:

$$V_{xy,n}(t) = \frac{2\chi}{\mu_0} \int dr P(r; v, T_1, T_w)\phi(r) B_0^2(r+vt)\frac{\omega^*_{1,n}(r+vt)}{I} F(\Delta\omega_0(r+vt))m_{xy}(t;r) \quad (11)$$

where a polarization term $P(r, v, T_1, T_w)$ has been introduced.

Signal equation (11) relates the detected signal in terms of the relevant magnetic fields on spin dynamics. In one aspect, the full signal equation (10) can be combined with the magnetization equation (9) and rewritten as follows to simplify its interpretation in order to highlight the primary factors of the signal equation (i.e., the basic sensitivity of the NMR measurement, the formation's NMR properties, the quantity of initially refocused magnetization, and the effective sensitivity of the measurement for each receiver coil):

$$V_{xy,n}(t) = V_0 \int dr s_n(r+vt) m_{ex}(r)[P(r;v,T_1,T_w)\phi(r)e^{-t/T_2(r)}] \quad (12)$$

In equation (12), $V_0$ is the sensitivity of the NMR measurement per unit volume for the tool. The term "$m_{ex}(r)$" is defined below.

Since the NMR measurement is sensitive over only a modest bandwidth, the sensitivity term $V_0$ in expression (12) assumes the strength of the magnetic field, $B_0$, is approximately constant and its value matches that excited by the RF field, $$\frac{\omega_{RF}}{\gamma}.$$

The measurement sensitivity for the $n^{th}$ coil, $s_n(r_{tool})$, is independent of time when described as a function of the tool's coordinates. It depends on the receiver coil efficiency, $$\frac{\omega^*_{1,n}}{I},$$

the effective electronic filtering, $F_n$, and the CPMG refocusing as the component of the refocused magnetization, $\hat{n}_B$, in the transverse plane:

$$s_n(r_{tool}) = \frac{\omega^*_{1,n}(r_{tool})}{I} F_n(\Delta\omega_0(r_{tool})) \mathfrak{C}\{\hat{n}_B(\omega_{1,t}(r_{tool}), \Delta\omega_0(r_{tool}))\} \quad (13)$$

where the operator $\mathfrak{C}\{\hat{n}\} \equiv \hat{n} \cdot \hat{x} + i\hat{n} \cdot \hat{y}$ projects the excited magnetization into the transverse plane and computes the corresponding complex representation of its phase. The excited magnetization $m_{ex}(r) \equiv [\hat{n}_B(\omega_{1,t}(r),\Delta\omega_0(r)) \cdot \mathfrak{R}_A(\omega_{1,t}(r),\Delta\omega_0(r))\{\hat{z}\}]$ is separated because it determines the detectable region, is independent of the receiver coil, and is a fixed scalar term independent of tool speed. In one embodiment, the NMR properties of the formation are what the measurement extracts as a function of formation position. The NMR properties include the spin density $\phi(r)$ (porosity), polarization $P(r, v, T_1, T_w)$ (reflecting $T_1$) and the $T_2$ decay ($e^{-t/T_2}$). These are quantities extracted by the measurement and so are written explicitly in signal equation (12).

Turning now to inversion methods for multiple coils, the purpose of a multi-coil inversion algorithm is for the processor to convert the detected NMR signal as a function of the receiver coil to a function of position in the formation. In terms of equation (12) this means that, given knowledge of the individual coil signals, the value of raw excited magnetization as a function of formation position (r) and decay time (t), $m_{raw}(r, t)$ should be determined. In other words, given:

$$V_{xy,n}(t) \tag{14a},$$

the following relationship should be found:

$$m_{raw}(r,t) = m_{ex}(r)P(r;v,T_1,T_w)\int dT_2 \Phi(r,T_2)e^{-t/T_2}. \tag{14b}$$

In conventional NMR logging, it is simply assumed that the initial position of the receive/transmit coil defines the examined region. Conventional reconstruction algorithms can then extract $\phi(r)$ and $f(T_2)$ from $m_{raw}(r, t)$, and adjustments according to polarization $P(r, v, T_1, T_w)$ can be applied in post-processing to the $T_2$ spectrum. However, various embodiments of the present disclosure account for the effect of receive coil motion during acquisition to enable faster logging speeds while maintaining fine resolution. Under these conditions, tool motion over the signal acquisition can be a significant fraction of, or can even exceed the individual receive coil size.

For the multiple detector design depicted in FIG. 3, the signal acquisition model is given by equation (14b). The inverse problem is defined by:

$$V_{xy,n}(t) = \int s_n(r-vt)m_{raw}(r,t)dr + \varepsilon_n(t). \tag{15}$$

In equations 14b and 15, $m_{raw}(r, t)$ is the effectively excited magnetization at time t and position r, which includes the effects of polarization and saturation with motion and the excited signal that is refocused and may be complex in the general case, $\phi(r,T_2)$ is the $T_2$ distribution profile versus position r, $V_{xy,n}(t)$ is the detector data recorded in the $n^{th}$ detector coil at time t (corresponding to the detected NMR signal), $s_n(r)$ is the sensitivity function for the $n^{th}$ detector coil at time t=0, which incorporates both the effects of the $B_1$ distribution of the $n^{th}$ detector coil and the refocusing performed by the transmitted RF pulse and may be complex in the general case, and $\varepsilon_n(t)$ is detector noise, typically additive white Gaussian noise with $E[\varepsilon_n(t)]=0$ and $E[\varepsilon_n(t)\varepsilon_m(t')]=\sigma^2 \delta_{n,m}\delta(t-t')$.

The sensitivity function of a detector coil is the electrical current generated within the coil by a unit of magnetic moment at a specific location within a detection zone of the coil. An integral of s(r) can be used to determine the total current in the coil (or actual signal). In the case of an NMR tool moving along a wellbore, only the coordinate X needs to be considered. The coordinates Y and Z can be removed through integration. This means that, in various embodiments, the sensitivity function can be defined as the electrical current generated within the coil by a slice at coordinate X: $s(X)=\int dYdZs(r=\{X, Y, Z\})$.

The sensitivity function for each detector (coil) can be determined at a surface location before deploying an NMR tool downhole. The sensitivity function may be determined through modeling using a given magnetic field profile and/or through testing of a given detector coil in a laboratory environment. For example, the sensitivity function can be determined using at least two methods. The first method uses a small test coil (e.g., much smaller than the detector coil) to transmit a small magnetic field of known amount (e.g., coil current of 1 ampere) at or near the coil operating frequency (e.g., if the detector coil has a Larmor frequency of 1 MHz, then the test coil transmits at 1.001 MHz). The test coil is placed at a position (r) relative to the detector coil and an NMR system is used to detect and measure the signal amplitude generated within the detector coil. This process can be repeated for many positions (r) so that the entire volume near the detection zone of the coil is analyzed. This data set of signal amplitudes can be used as the sensitivity function for the coil. If the coils on an NMR tool have similar geometries and are installed on the tool in a similar manner, then the same sensitivity function can be used for each of the coils. Alternatively or additionally, the method described above can be performed for an entire NMR tool with multiple coils. At multiple positions within the detection zone of the NMR tool, the signal generated by the test coil is detected and measured at all the coils. In this manner, the response of all coils can be measured in a single procedure.

The second method for determining a sensitivity function of a detector coil uses signal generated by a test sample. The test sample (e.g. a container of water) is placed in the detection zone of the NMR tool at a position (r). The size of the test sample should be sufficiently small so that the sensitivity function can be accurately represented. The NMR tool applies a desired NMR pulse sequence to the test sample and the resulting signal amplitude generated within the multiple detector coils are measured. This process can be repeated for many positions (r) so that the entire volume near the detection zone of the NMR tool is analyzed. This data set of signal amplitudes can be used as the sensitivity function for the NMR tool. In another example, a planar test sample (in the Y-Z plane) be placed at position X along the tool axis. The NMR tool applies a desired NMR pulse sequence to the planar test sample and the resulting signal amplitude generated within the detector coils is measured. The planar sample can be moved to multiple positions along the tool axis and used to acquire signal at many different positions. This data set of signal amplitudes can be used as the sensitivity function (defined as the electrical current generated within the coil by a slice at coordinate X).

Now returning to the description of the inversion, equation (14b) is substituted into equation (15) to obtain:

$$V_{xy,n}(t) = \int\int s_n(r-vt)\exp\left(-\frac{t}{T_2}\right)\phi(r, T_2)drdT_2 + \varepsilon_n(t) \tag{16}$$

$$= \int\int K(n, t, r, T_2)\phi(r, T_2)drdT_2 + \varepsilon_n(t)$$

where the kernel is defined by:

$$K(n, t, r, T_2) \equiv s_n(r-vt)\exp\left(-\frac{t}{T_2}\right). \tag{17}$$

Written in this form, equation (16) can be identified as a two-dimensional Fredholm integral equation of the first kind.

Given a sequence of measurements $$\{V_{xy,n}(t)\}\begin{cases} n = 1, 2, \ldots, N \\ t = t_1, t_2, \ldots, t_T \end{cases}$$

where N is the number of detection coils, and T is the number of time samples, according to one embodiment, equation (16) may be solved as follows. First, to make equation (16) more computationally tractable, the detected data $V_{xy,n}(t)$ is collected into an equivalent vector (e.g., by column-wise stacking), and the four dimensional tensor represented in the kernel $K(n, t, r, T_2)$ is similarly stacked into a two dimensional matrix with both r and $T_2$ being discretized over their expected ranges. As a result, the following discretized and vectorized equation is obtained:

$$D = KA + \varepsilon, \quad (18)$$

where D is the data vector (data from some or all coils), A the parameter vector ($T_2$ distribution at some or all positions), K the 2D kernel. The length of vector D, $|D|=TN$ ($\times 1$), the length and width of matrix K are TN, $|r||T_2|$, respectively, the length of vector A is $|A|=|r||T_2|$ ($\times 1$), and the length of vector $\varepsilon$ is $|\varepsilon|=TN$ ($\times 1$). Next, the reduced singular value decomposition of K can be denoted by the product of three matrices, $K=U\Sigma V^T$ (with superscript T indicating a transpose), where:

$$U^T U = I_{\rho \times \rho} V^T V = I_{\rho \times \rho} \Sigma = \mathrm{diag}(\sigma_1, \sigma_2, \ldots, \sigma_\rho) \quad (19)$$

$\rho = \mathrm{Rank}(\Sigma)$ $|K|=TN \times |r||T_2|, |U|=TN \times \rho, |\Sigma|=\rho \times \rho, |V|=|r||T_2| \times \beta.$ Thus, both U and V are identity matrices, and matrix $\Sigma$ is ranked (e.g., ordered in decreasing order). With values for the vector D and matrix K being known, the solution (values) for vector A (i.e., $\phi(T_2, r)$), may be obtained. In one embodiment, in order to reduce the computation involved in computing vector A, constraints are placed on the vector, and the vector is determined in a two step process. In a first step, detector data are compressed by a processor to a reduced-order space (as over time, the data obtained from the decaying signals trend towards a zero value), and in a second step, a non-linear optimization problem is solved by the processor to estimate $\phi(T_2, r)$.

In one embodiment, once estimates or determinations of $T_2$ distributions at different location r are obtained, these determinations may be shown on a monitor or may be printed on paper. In one embodiment, a series of $T_2$ distributions are shown for a series of locations r along a wellbore.

According to one embodiment, for data compression, let:

$$\hat{D} \equiv U^T D |D| = \rho \times 1$$

$$\hat{K} \equiv U^T K |K| = \rho \times |r||T_2|. \quad (20)$$

Using the properties of unitary matrices, it can be shown that minimizing:

$$\mathrm{argmin}_{A \geq 0} \|D - KA\|_2^2 + \lambda \|A\|_2^2$$

is equivalent to minimizing:

$$\mathrm{argmin}_{A \geq 0} \|\hat{D} - \hat{K}A\|_2^2 + \lambda \|A\|_2^2 \quad (21)$$

where the brackets $\| \ \|$ indicate the norm of the operator with the subscript indicating the kind of norm and the superscript indicating a standard power value, and where $\lambda$ is a smoothing variable. In equation (21), the first term represents a difference between the data and the fit, and the second term defines the smoothness (regularization) of the function.

Having compressed the data, equation (21) can be cast as a least squares problem with:

$$A_\lambda = \mathrm{argmin}_{A \geq 0} \|D - KA\|_2^2 + \lambda \|A\|_2^2 \quad (22)$$

-continued $$= \mathrm{argmin}_{A \geq 0} \left\| \begin{pmatrix} D \\ 0 \end{pmatrix} - \begin{pmatrix} K \\ \sqrt{\lambda} I \end{pmatrix} A \right\|$$

$$= \mathrm{argmin}_{A \geq 0} \|\tilde{D} - \tilde{K}A\|,$$

where I is the identity matrix, and where $\hat{D}$ and $\hat{K}$ are defined according to $$\hat{D} \equiv \begin{pmatrix} D \\ 0 \end{pmatrix} \text{ and } \hat{K} \equiv \begin{pmatrix} K \\ \sqrt{\lambda} I \end{pmatrix}.$$

This is a non-linear least squares problem, with the non-linearity being introduced by the non-negativity constraint on A. In one embodiment this optimization problem is solved in a constrained high dimension space or as an unconstrained optimization problem in a lower dimensional space, obtained by incorporating the Kuhn-Tucker conditions for the gradient of the cost function within the feasible region of solutions. See, Butler, J. P. et al., "Estimating solutions of the first kind integral equations with nonnegative constraints and optimal smoothing", SIAM J. Numerical Analysis, (1981), which is hereby incorporated by reference herein in its entirety.

Having set forth equations that account for coil motion during signal acquisition of a multiple NMR detector tool moving through a wellbore, and having set forth corresponding inversion methods for determining $\phi(r, T_2)$ from signals obtained by such a tool, a simulation was conducted in order to test the efficacy of the inversion methods.

In the simulation, a reference model for the distribution $A(r, \log T_2)$ was defined on a continuous two-dimensional grid. For simplicity of computation, a reference model of a separable form was considered:

$$A(r, \log T_2) = A_r(r) A_{\log T_2}(\log T_2). \quad (23)$$

Figure 4:
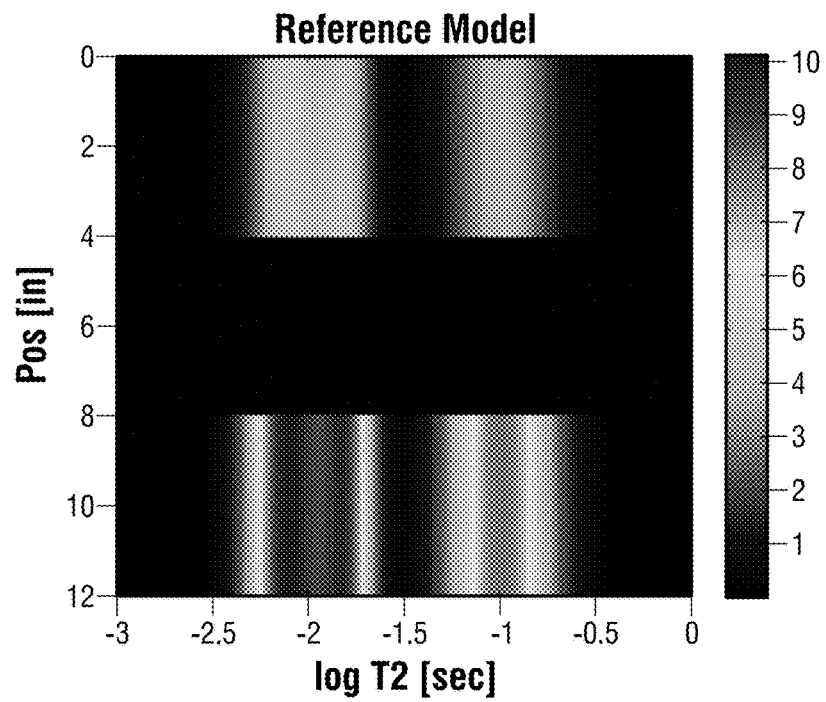
FIG. 4 is a reference model for a $T_2$ distribution defined on a continuous two-dimensional grid.

An example for a reference model is shown in FIG. 4, with:

$A_r(r) = 1 \cdot 1 (0 \leq r \leq 4) + 2 \cdot 1 (8 \leq r \leq 12)$ $A_{\log T_2}(\log T_2) = 4N(-1, 0.2) + 4N(-1.8, 0.1) + 5N(-2.1, 0.15)$ where $N(\mu, \sigma^2)$ is proportional to a Gaussian distribution with mean $\mu$ and variance $\sigma^2$.

Next, samples $V_{xy,n}(t)$ were generated according to the continuous signal model of equation (14b). The deterministic part was computed first, using a reference model separability property to heavily alleviate the computational load:

$$\iint s_n(r - vt) \exp\left(-\frac{t}{\exp(\log T_2)}\right) A(r, \log T_2) dr d\log T_2 = \quad (24)$$

$$\int s_n(r - vt) A_r(r) dr \int \exp\left(-\frac{t}{\exp(\log T_2)}\right) A_{\log T_2}(\log T_2) d\log T_2$$

Figure 5A:
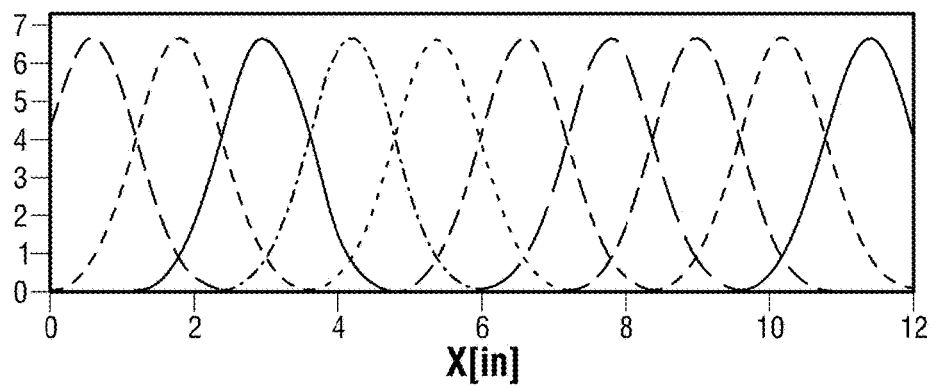
FIG. 5A is a diagram illustrating Gaussian sensitivity profiles of detector coils moving at a given speed.
Figure 5A:
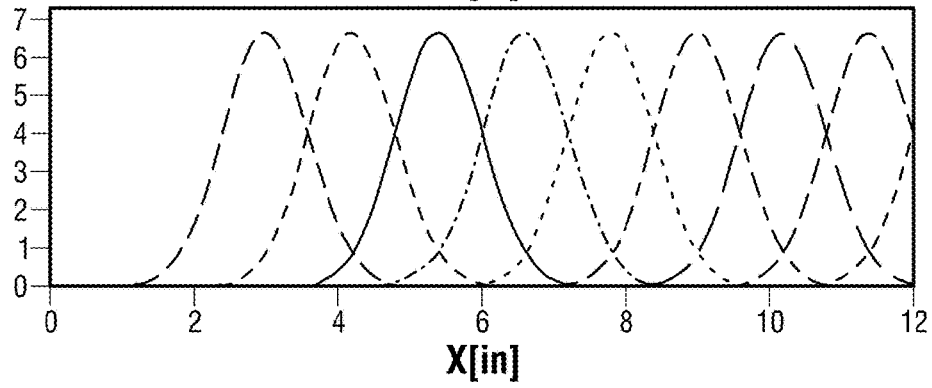

For the example shown in FIG. 5A, N=10 coils are moving towards the right at velocity v=3 in/sec (=900 feet/hour). The coils all have Gaussian sensitivity profiles, which are illustrated in FIG. 5A at times t=200 µs (top) and t=0.8 sec (bottom). For each coil, $V_{xy,n}(t)$ were calculated for T=4000 time samples spread 200 µs apart. While the integral over $\log T_2$ can be evaluated numerically, analytic expressions were used to evaluate the integrals over r, which are expressible using Gaussian error functions due to the choice of Gaussian sensitivity profiles and Gaussian $T_2$ distributions. Following the calculation of the deterministic part, white Gaussian noise according to the desired SNR level was added, which for purposes herein is defined as:

$$SNR \equiv \frac{\max_n D_n(t=0)}{\sigma} \Rightarrow \sigma = \frac{\max_n D_n(t=0)}{SNR}, \quad (25)$$

where $D_n$ is the signal obtained from coil n.

Figure 5B:
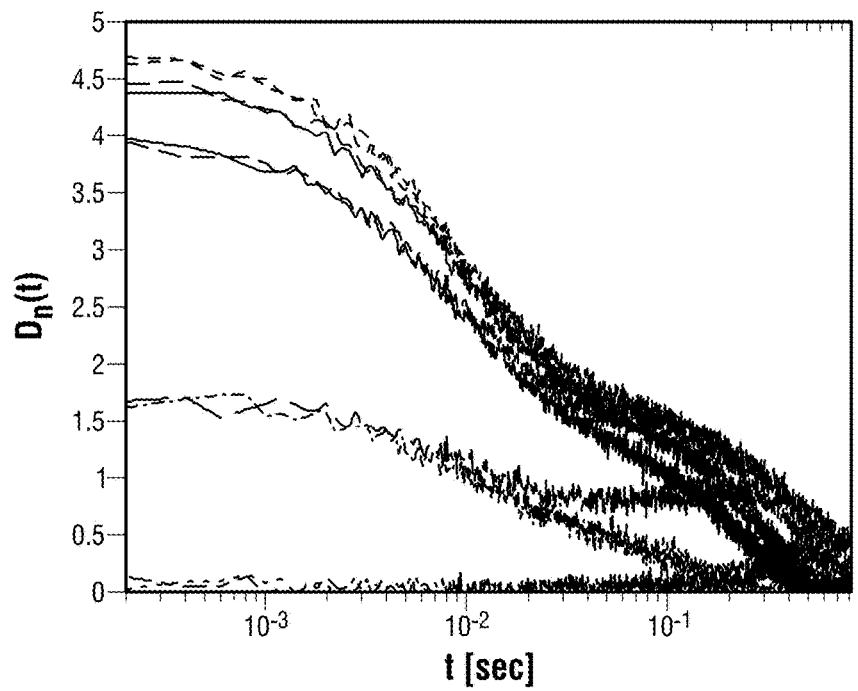
FIG. 5B is a diagram of measurements recorded by the moving coils.

Calculated coil measurements are depicted in FIG. 5B, where a SNR of 80 was utilized. The detector data for the ten coils are not exponential or even monotonically decreasing with time as the coils can move in or out of a region exhibiting strong response as they move along the structure.

Figure 6:
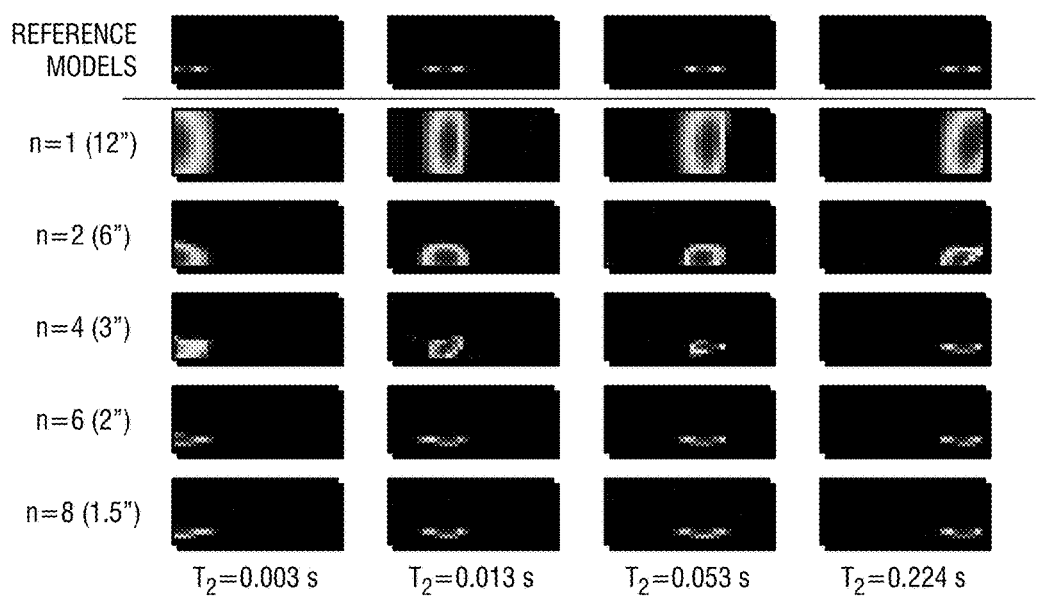
FIG. 6 is a diagram showing reconstruction results versus $T_2$ for different numbers of coils.
Figure 7:
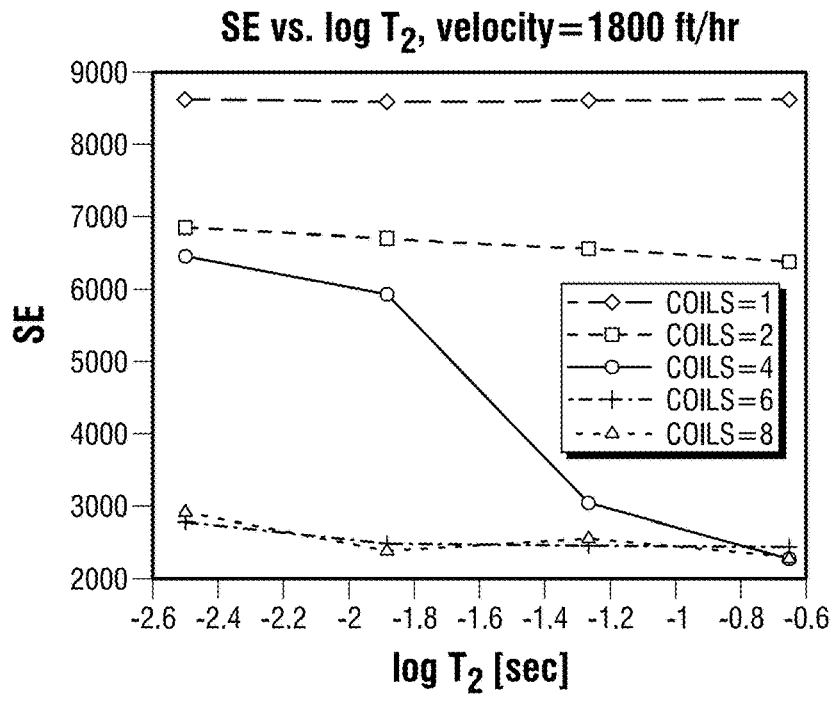
FIG. 7 is a plot of the squared error between reconstructed distribution results and the actual model $T_2$ distributions for a target of a first size for different numbers of coils.

Turning now to data analysis, the tool aperture was set to 12 inches, the tool velocity was set to 1800 ft/hr, and a given spatial $T_2$ distribution was reconstructed using tools of varying number of coils. This procedure was repeated for several such distributions, all having an interacting component having a one inch target with a rectangular support function between 9 inches<r<10 inches, and a Gaussian log $T_2$ distribution profile with center positions swept between −2.5 and −0.65. This is exemplified in FIG. 6 where the center log $T_2$ position varies along the columns and the number of reconstructing coils n=1, 2, 4, 6, 8 varies along the rows. These results are concisely summarized in FIG. 7 where the squared error between the reconstructed distribution results and the real underlying $T_2$ distributions as depicted in the first row of FIG. 6 is plotted. It can be seen that the reconstruction fidelity increases with the number of coils, with most of the effect occurring in the increase from four to six coils, such that the coil length is on the order of two inches. Introducing two additional coils does not improve the results for this specific target. The one inch target is spatially resolved using six coils.

Figure 8:
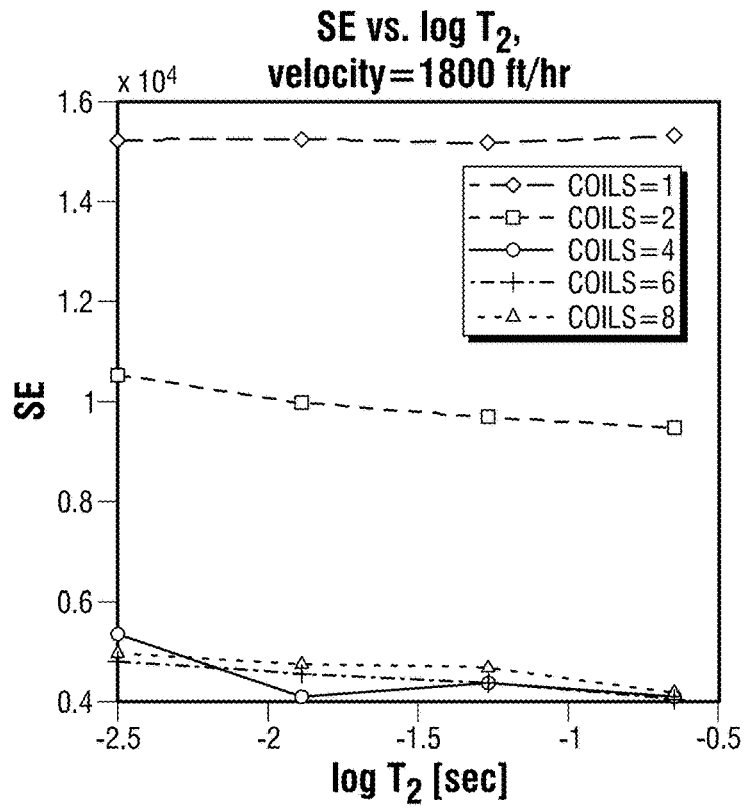
FIG. 8 is a plot of the squared error between reconstructed distribution results and the actual model $T_2$ distributions for a target of a second size for different numbers of coils.

To gain a deeper insight as to the connection between the spatial resolution and the number of coils, a similar experiment was conducted where a larger two inch target was imaged, supported on 8 inches<r<10 inches. The reconstruction squared error results appear in FIG. 8. Clearly, this larger target is spatially resolved by increasing the number of coils from two coils to four coils. In one aspect, these results facilitate selection of the number of coils in a tool. In particular, as the coils get smaller, smaller targets can be resolved. For example, the resolution of a one inch target does not significantly improve from using coils smaller than two inches, and the resolution of a two inch target does not significantly improve from using coils smaller than three inches. Therefore, in one embodiment, the length of the coils can be designed to be roughly twice the spatial resolution. In another embodiment, the length of the coils can be designed to be roughly one inch larger than the spatial resolution.

Figure 9:
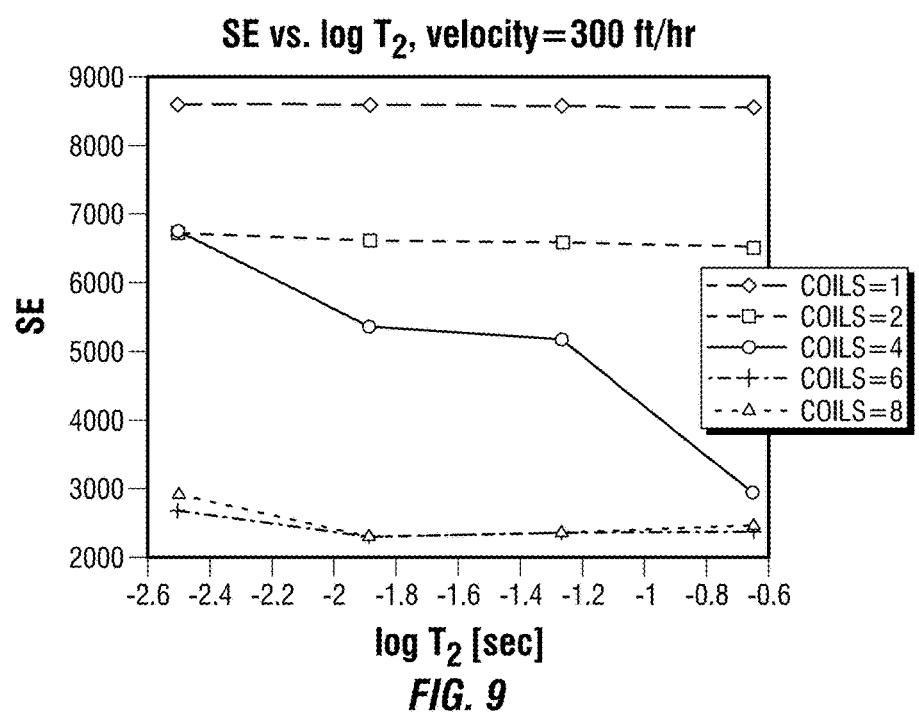
FIG. 9 is a plot of squared error versus $\log(T_2)$ for tools of different numbers of coils.

In one aspect, it is also observed that the longer $T_2$ components are more easily resolved compared to short $T_2$ components. One possible explanation for this observation is that short $T_2$ components effectively completely decay before the coils shift a substantial distance, making it hard to resolve them to within less than a single coil aperture. On the other hand, large $T_2$ components are long-lived and exhibit strong signals while the coils pass along, making it easier to resolve them to within a smaller resolution than the single coil aperture. Thus, increasing the tool velocity increases spatial resolution in some cases, as $T_2$ components will experience substantial aperture shifts within their lifespan. To confirm this, the experiment of FIG. 7 was repeated, with a slower tool velocity v=1 in/sec (=300 ft/hr) as opposed to 1800 ft/hr. The squared error results are summarized in FIG. 9. Indeed, with the n=4 coils threshold level, and a target centered around log $T_2$=−1.27 or log $T_2$=−0.65, the faster tool (shown in FIG. 7) is substantially superior to the slower one (FIG. 9). Therefore, in one embodiment, for a given $T_2$, an optimal cable speed could be calculated so that the $T_2$ is maximally resolved.

According to one embodiment, the methods and processes described above may be modified and/or extended to provide for the determination of $T_1$, D, and other formation parameters at different locations r in the formation. For example as discussed in U.S. Pat. No. 6,597,171 to Hurlimann et al., issued on Jul. 22, 2003, which is hereby incorporated by reference in its entirety herein, the CPMG sequence can be modified to do 2D measurements relating $T_2$ to other NMR parameters such as $T_1$ and D. These same sequence modifications can be made for a multiple coil design, wherein the coil sensitivity and tool motion are incorporated to better resolve these parameters as a function of position in an analogous manner as described here for the CPMG sequence.

Figure 10:
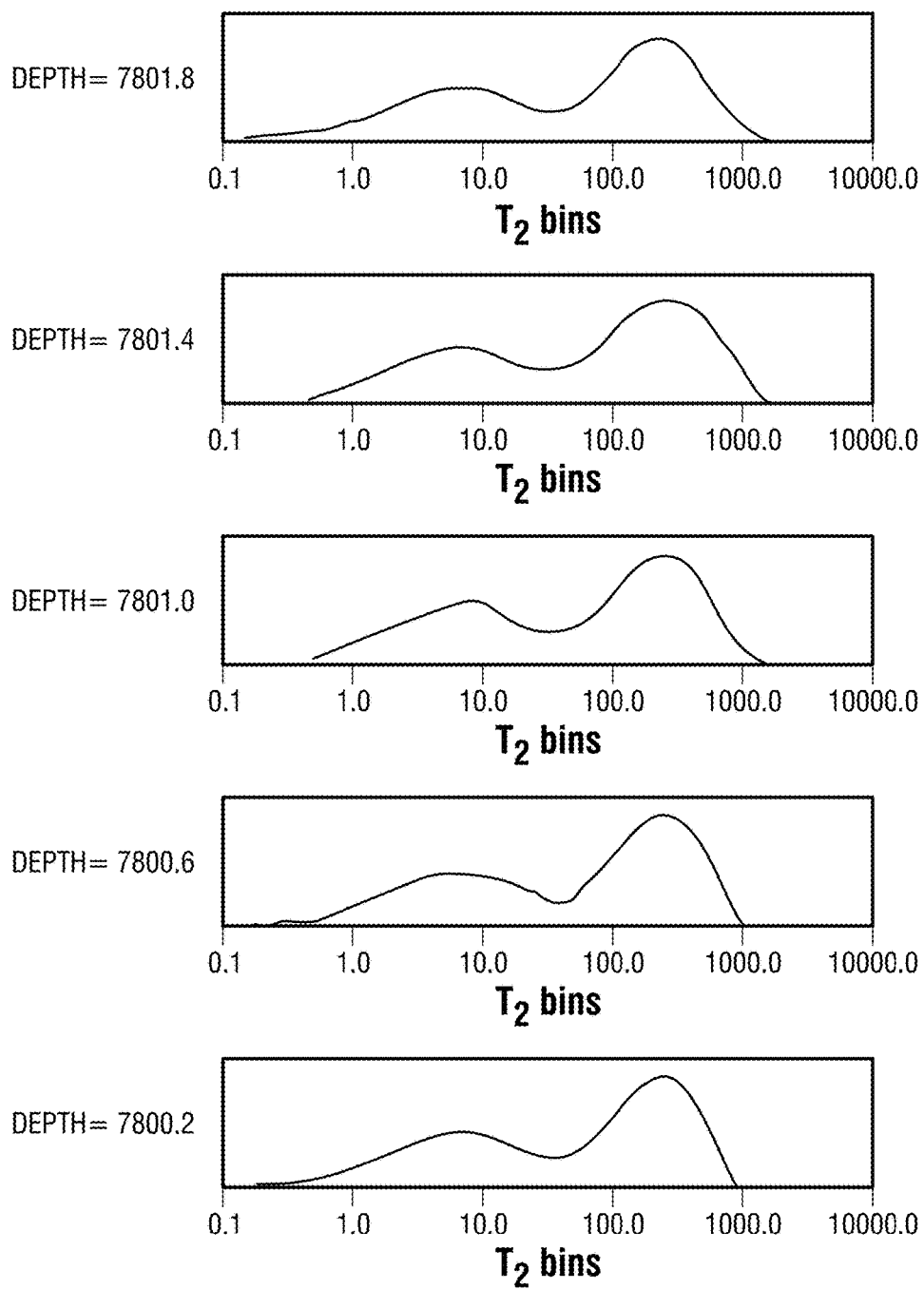
FIG. 10 is a log of $T_2$ distributions at multiple locations along a wellbore.

In one embodiment, the results of the methods and processes described above are provided for viewing. The results may be provided for viewing on a (computer) monitor or on paper in the form of a "log". By way of example only, and not by way of limitation, for each location r, a $T_2$ distribution curve may be shown. An example of this type of log is seen in FIG. 10 for five locations r which are all within a few inches of each other. A log such as the log in FIG. 10 may be extended to all locations r of interest along the wellbore.

Figure 11A:
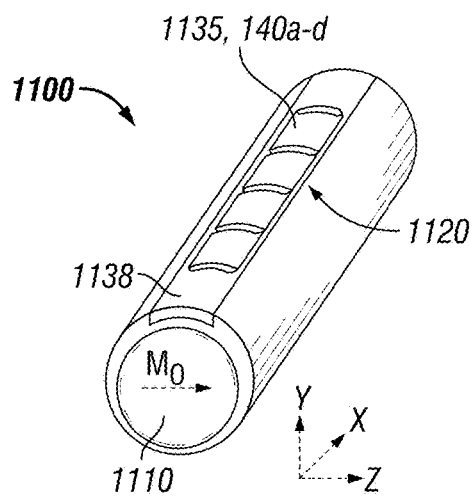
FIGS. 11A-11C are respectively a perspective view of a portion of one embodiment of an NMR logging tool, the magnetic fields generated by that logging tool, and a vertical cross section through that logging tool and the formation volume affected by the magnetic field generated by that logging tool.
Figure 11B:
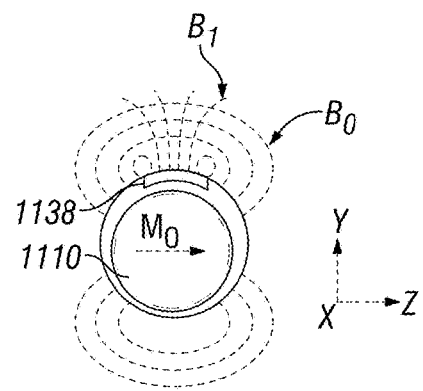
Figure 11C:
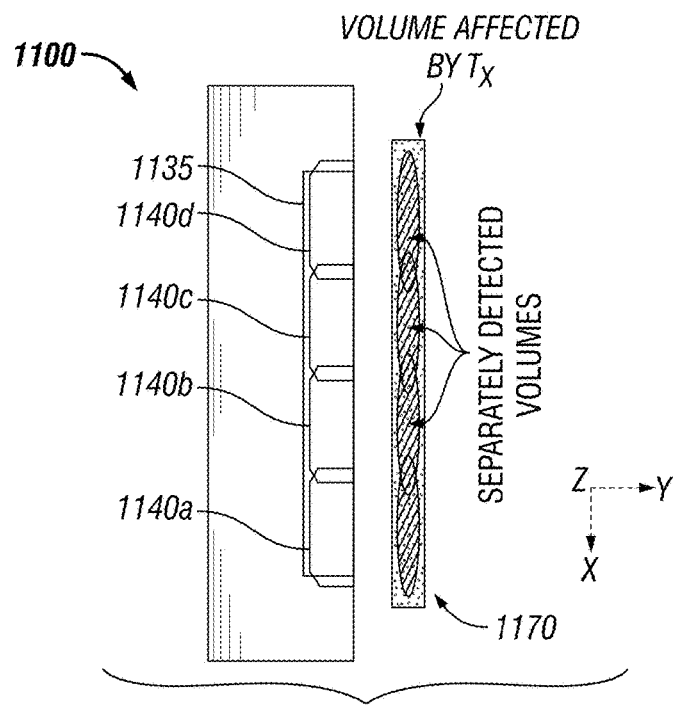

Turning now to FIG. 11A, a perspective view of a portion of one embodiment of a high logging speed NMR logging tool 1100 is seen. Tool 1100 includes a permanent magnet 1110 with a long axis directed in the direction of the vertical axis of the tool, and a transmission-detection module 1120 which is radially spaced from the permanent magnet 1110. The transmission-detection module 1120 includes a ferrite slab 1138 running parallel to the permanent magnet along a surface of the tool 1100, a transmit coil (loop) 1135 that is attached to the outer surface of the slab 1138 for applying RF pulses (shown in more detail in FIG. 11C), and a plurality of overlapping receiver coils (loops) 1140a-1140d that are also attached to the outer surface of the ferrite slab 1138 such that the receivers are situated vertically along the length of the tool (shown in more detail in FIG. 11C). The ferrite slab 1138 may run the entire length of the magnet 1110. The permanent magnet 1110 may extend axially beyond the transmission-detection module 1120. As seen in FIG. 11B, the permanent magnet 1110 generates a static magnetic field $B_0$ along the Z axis or roughly parallel to the tool face which determines the frequency and orientation of the oscillation of nuclear magnetization, while the transmit coil 1135 in conjunction with the ferrite slab 1138 generate a magnetic field $B_1$ along the Y axis; i.e., orthogonal to the static magnetic field, or roughly perpendicular to the tool face, thereby permitting manipulation of spins and detection of signals. The transmitter loop 1135 may extend completely around the receiver coils 1140a-1140d, or may extend only substantially around the receiver coils as seen in FIG. 11C (e.g., only partially around the receiver coils). In various embodiments, the volumes of the formation 1170 that the receivers 1140a-1140d separately detect are overlapping as shown in FIG. 11c. The overlapping configuration helps minimize coil coupling and improves inversion of detector data when the NMR signal passes from one coil to the next coil (e.g., the passage from one coil to the next is easier to detect). The signals simultaneously detected by the receivers such as previously described with reference to equation (12) are separately obtained, and may be amplified, digitized, and processed as previously described. For example, as detailed in U.S. Pat. No. 9,069,098 to Hopper, et al., issued on Jun. 30, 2015, which is hereby incorporated by reference herein in its entirety, each receiver coil can have its own preamplifier and analog to digital converter (ADC). Alternatively, the output from the preamplifiers could be multiplexed and digitized by a single ADC.

Figure 12A:
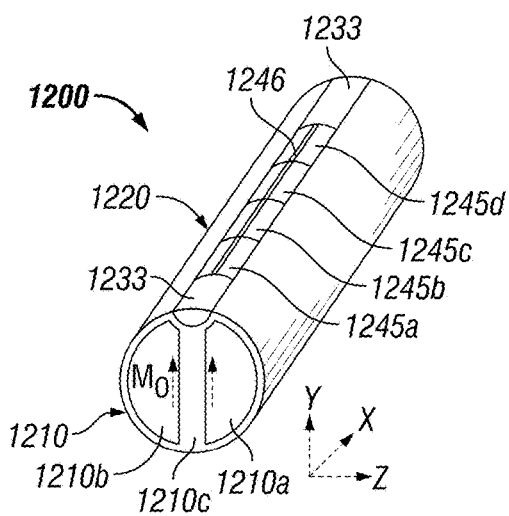
FIGS. 12A-12C are respectively a perspective view of a portion of another embodiment of an NMR logging tool, the magnetic fields generated by that other logging tool embodiment, and a vertical cross section through that other logging tool and the formation volume affected by the magnetic field generated by that other logging tool.
Figure 12B:
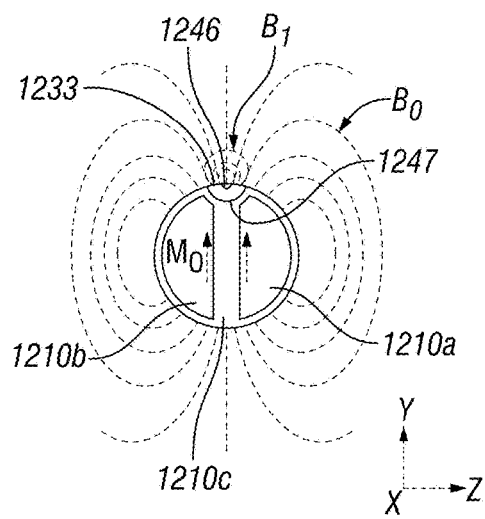
Figure 12C:
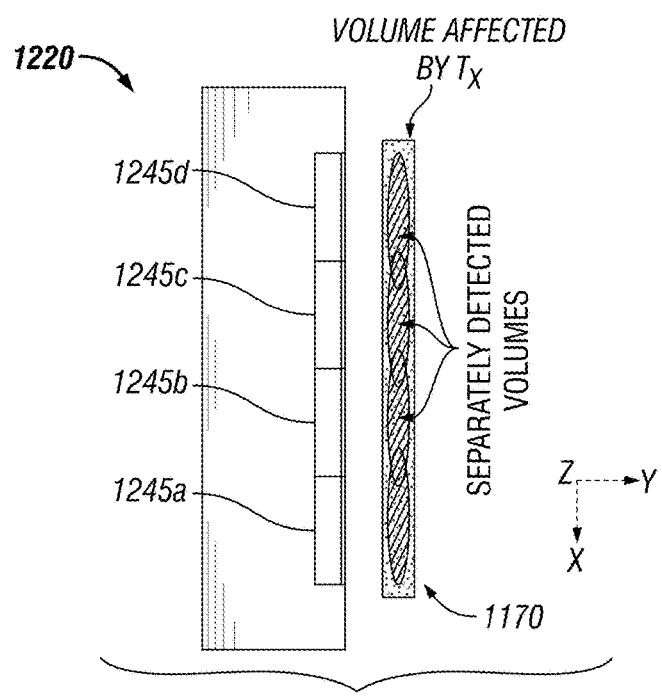

A perspective view of a portion of another high logging speed NMR tool is seen in FIG. 12A, where tool 1200 includes a split permanent magnet 1210 with a long axis directed in the direction of the vertical axis of the tool, and a transmission-detection module 1220 which is radially spaced from the permanent magnet 1210. The split magnet 1210 includes magnets 1210a, 1210b that are nearly semi-circular in cross-section separated by a non-magnetic element 1210c. The transmission-detection module 1220 includes a ferrite slab 1233 that is nearly semi-circular in cross section and that runs parallel to the permanent magnet along a surface of the tool 1200 and a plurality of coils 1245a-1245d (four half-coax antennas) on the outer surface of ferrite 1233 with a center conductor 1246 and a half cylindrical shield 1247 on the back surface of the slab 1233 as seen in FIG. 12B. The center conductor 1246 detects the NMR signal, while the shield 1247 is a current return for the center conductor. The coils 1245a-1245d together act as a single transmitter when they are synchronously pulsed so as to produce the same effect as pulsing a single long coil. However, the coils also act as separate receivers which simultaneously receive signals. As seen in FIG. 12B, the permanent magnet 1210 generates a static magnetic field $B_0$ along the Y axis or roughly perpendicular to the tool face which determines the frequency and orientation of the oscillation of nuclear magnetization, while the coils 1245a-d in conjunction with the ferrite slab 1233 generate a magnetic field $B_1$ along the Z axis; i.e., orthogonal to the static magnetic field, and roughly parallel to the tool face, thereby permitting manipulation of spins and detection of oscillations. The volumes of the formation 1270 that the coils 1245a-1245d separately detect are overlapping as shown in FIG. 12C. The signals simultaneously detected by the receivers such as previously described with reference to equation (12) are separately obtained, and may be amplified, digitized, and processed as previously described.

It should be appreciated that other embodiments may be provided using multiple detectors where the detectors do not overlap and/or the detectors detect formation volumes that do not overlap. In various embodiments, the inversion of detector data may be simpler when the formation volumes that do not overlap. However, the signal-to-noise ratio of such data may be lower.

Some of the methods and processes described above, such as data compression, non-linear optimization, and determination for formation parameters are performed by a processor. The term "processor" should not be construed to limit the embodiments disclosed herein to any particular device type or system. The processor may include a single processor, multiple processors, or a computer system. The computer system may also include a computer processor (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Thus, by way of example only, and not by way of limitation, while various embodiments describe an NMR tool having 2, 4, 6, 8, or 10 coils, it will be appreciated that other numbers of coils, could be utilized. Also, while a particular processing of detector data has been described involving (i) collection of the detector data into an equivalent vector by column-wise stacking, (ii) stacking of a four dimensional tensor represented in a kernel into a two dimensional matrix with values of variables being discretized over their expected ranges, and (iii) linear algebra utilizing data compression and non-linear optimization, it will be appreciated that any one or all of those processing techniques could be modified in order to solve the inversion of the detector data into a determination of $\phi(r, T_2)$. Accordingly, all such modifications are intended to be included within the scope of this disclosure.

What is claimed is:

1. A system for logging a wellbore traversing a formation, the system comprising:
   a nuclear magnetic resonance (NMR) tool comprising:
   a magnet configured to apply a static magnetic field to the formation, and
   a transmission-detection module (i) that is configured to apply an oscillating magnetic field to the formation and (ii) that includes a plurality of coil detectors that detect NMR signals generated within the formation, wherein the plurality of coil detectors are spaced along an axis parallel to the longitudinal axis of the tool, the size of the coil detectors being selected as a function of desired spatial resolution of the NMR tool; and at least one processor configured to:
(i) receive detector data that corresponds to the NMR signals detected by the plurality of detectors over time and as the NMR tool moves along a length of the wellbore and
(ii) determine a $T_2$ distribution profile of the formation at multiple locations along the length of the wellbore (a) by using the detector data obtained from at least two of the plurality of coil detectors together and (b) by accounting for tool motion along the length of the wellbore.

2. The system according to claim 1, wherein the plurality of coils detectors comprises at least four coils detectors.

3. The system according to claim 1, wherein the at least one processor determines the $T_2$ distribution profile of the formation at multiple locations along the length of the wellbore by accounting for tool motion along the length of the wellbore during a single NMR pulse sequence.

4. The system according to claim 1, further comprising:
a display that displays the $T_2$ distribution profile as a function of location along the length of the wellbore.

5. A system for logging a wellbore traversing a formation, the system comprising:
a nuclear magnetic resonance (NMR) tool comprising:
  a magnet configured to apply a static magnetic field to the formation, and
  a transmission-detection module (i) that is configured to apply an oscillating magnetic field to the formation and (ii) that includes a plurality of detectors that detect NMR signals generated within the formation, wherein the plurality of detectors are spaced along an axis parallel to the longitudinal axis of the tool; and
at least one processor configured to:
  (i) receive detector data that corresponds to the NMR signals detected by the plurality of detectors over time and as the NMR tool moves along a length of the wellbore and
  (ii) determine a parameter of the formation at multiple locations along the length of the wellbore (a) by using the detector data obtained from at least two of the plurality of detectors together and (b) by accounting for tool motion along the length of the wellbore using a velocity of the tool along the length of the wellbore and at least one sensitivity function for the plurality of detectors.

6. The system according to claim 5, wherein the parameter of the formation comprises the $T_2$ distribution profile of the formation, and the at least one processor determines the $T_2$ distribution profile of the formation at multiple locations along the length of the wellbore by determining a $T_2$ distribution profile that is consistent with the detector data obtained from the plurality of detectors, wherein the detector data and the $T_2$ distribution profile are related by:

$$V_{xy,n}(t) = \int\int s_n(r - vt)\exp\left(-\frac{t}{T_2}\right)\phi(r, T_2)drdT_2 + \varepsilon_n(t),$$

wherein $\phi(r,T_2)$ is the $T_2$ distribution profile versus location r, $V_{xy,n}(t)$ is the detector data recorded in the $n^{th}$ detector of the plurality of detectors at time t, $s_n(r)$ is the sensitivity function for the $n^{th}$ detector, v is the velocity of the tool along the length of the wellbore, and $\varepsilon_n(t)$ is noise.

7. The system according to claim 6, wherein the at least one processor inverts the detector data by (i) stacking the detector data from the plurality of detectors into a vector, (ii) stacking a four-dimensional tensor represented by a Kernel $K(n, t, r, T_2)$, where $$K(n, t, r, T_2) \equiv s_n(r - vt)\exp\left(-\frac{t}{T_2}\right),$$

into a two-dimensional matrix, where n is the detector index, t is a time index, r is a location index, and $T_2$ is a signal decay time, (iii) compressing the detector data to a reduced-order space, and (iv) solving a resulting non-linear optimization problem.

8. A method of investigating an earth formation surrounding a wellbore, the method comprising:
moving a nuclear magnetic resonance (NMR) tool comprising (i) a permanent magnet and (ii) a transmission-detection module that includes a plurality of detectors spaced along an axis parallel to the longitudinal axis of the tool;
applying an oscillating magnetic field to the earth formation surrounding the wellbore using the transmission-detection module while moving the tool along a length of the wellbore;
detecting NMR signals with the plurality of detectors to obtain detector data while moving the tool along a length of the wellbore; and
processing the detector data to obtain a $T_2$ distribution profile of the formation as a function along the length of the wellbore by accounting for tool motion along the length of the wellbore by accounting for tool motion along the length of the wellbore during a single NMR pulse sequence by using (i) a velocity of the tool along the length of the wellbore and (ii) at least one sensitivity function for the plurality of detectors.

9. A method according to claim 8, wherein applying an oscillating magnetic field to the earth formation surrounding the wellbore comprises applying a Carr-Purcell-Meiboom-Gill (CPMG) pulse sequence to the formation.

10. The method according to claim 8, wherein the $T_2$ distribution profile of the formation at multiple locations along the length of the wellbore is determined by determining a $T_2$ distribution profile that is consistent with the detector data obtained from the plurality of detectors, wherein the detector data and $T_2$ distribution profile are related by:

$$V_{xy,n}(t) = \int\int s_n(r - vt)\exp\left(-\frac{t}{T_2}\right)\phi(r, T_2)drdT_2 + \varepsilon_n(t),$$

wherein $\phi(r,T_2)$ is the $T_2$ distribution profile versus location r, $V_{xy,n}(t)$ is the detector data recorded in the $n^{th}$ detector of the plurality of detectors at time t, $s_n(r)$ is the sensitivity function for the $n^{th}$ detector at time t=0, v is the velocity of the tool along the length of the wellbore, and $\varepsilon_n(t)$ is noise.

11. The method according to claim 10, wherein the $T_2$ distribution profile of the formation at multiple locations along the length of the wellbore is determined by performing an inversion that comprises:
(i) stacking the detector data from the plurality of detectors into a vector,
(ii) stacking a four-dimensional tensor represented by a Kernel $K(n, t, r, T_2)$, where $$K(n, t, r, T_2) \equiv s_n(r - vt)\exp\left(-\frac{t}{T_2}\right),$$

into a two-dimensional matrix, where n is the detector index, t is a time index, r is a location index, and $T_2$ is a signal decay time,
(iii) compressing the detector data to a reduced-order space, and
(iv) solving a resulting non-linear optimization problem.

12. A method according to claim 10, further comprising: calculating an optimal tool velocity for maximally resolving the $T_2$ distribution profiles.

13. A method according to claim 8, further comprising: displaying the $T_2$ distribution profile as a function of location along the length of the wellbore.

14. A nuclear magnetic resonance (NMR) tool for logging a wellbore traversing a formation, the tool comprising:
   at least one permanent magnet directed parallel to a longitudinal axis of the tool and that generates a static magnetic field within the formation;
   a transmission-detection module (i) comprising an oscillating magnetic field source that is configured to apply an oscillating magnetic field orthogonal to the static magnetic field and (ii) that includes a plurality of detectors that detect NMR signals and that are spaced along an axis parallel to the longitudinal axis of the tool, wherein the plurality of detectors simultaneously detect NMR signals from a continuous volume of the formation, wherein the transmission-detection module comprises a ferrite slab that is parallel to the longitudinal axis of the tool and comprises an outer face, and the oscillating magnetic field source and the plurality of detectors are located on the outer face of the ferrite slab; and
   at least one processor coupled to the plurality of detectors and configured to:
      (i) receive detector data that corresponds to the NMR signals detected by the plurality of detectors over time and as the NMR tool moves along a length of the wellbore and
      (ii) determine a parameter of the formation at multiple locations along the length of the wellbore (a) by using the detector data obtained from at least two of the plurality of detectors together and (b) by accounting for tool motion along the length of the wellbore.

15. The tool according to claim 14, wherein the oscillating magnetic field source and the plurality of detectors are implemented by a plurality of coils that are synchronously pulsed to transmit an oscillating magnetic field and that separately and simultaneously detect resulting NMR signals from the formation.

16. The tool according to claim 14, wherein the at least one permanent magnet produces a static magnetic field that is substantially parallel to the face of the tool.

17. The tool according to claim 14, wherein the at least one permanent magnet comprises a plurality of permanent magnets separated by a non-magnetic material such that the at least one permanent magnet produces a static magnetic field substantially perpendicular to a face of the tool.

18. The tool according to claim 14, wherein the plurality of detectors comprises at least four coils.

19. A nuclear magnetic resonance (NMR) tool for logging a wellbore traversing a formation, the tool comprising:
   at least one permanent magnet directed parallel to a longitudinal axis of the tool and that generates a static magnetic field within the formation;
   a transmission-detection module (i) comprising an oscillating magnetic field source that is configured to apply an oscillating magnetic field orthogonal to the static magnetic field and (ii) that includes a plurality of detectors that detect NMR signals and that are spaced along an axis parallel to the longitudinal axis of the tool, wherein the plurality of detectors simultaneously detect NMR signals from a continuous volume of the formation; and
   at least one processor coupled to the plurality of detectors and configured to:
      (i) receive detector data that corresponds to the NMR signals detected by the plurality of detectors over time and as the NMR tool moves along a length of the wellbore and
      (ii) determine a parameter of the formation at multiple locations along the length of the wellbore (a) by using the detector data obtained from at least two of the plurality of detectors together and (b) by accounting for tool motion along the length of the wellbore,
   wherein the oscillating magnetic field source comprises a transmitter coil and the plurality of detectors comprise a plurality of detector coils with
   the transmitter coil at least substantially surrounding the plurality of detector coils.

20. The tool according to claim 19, wherein the plurality of detector coils overlap each other.

* * * * *